United States Patent [19]
Glaze

[11] 3,824,405
[45] July 16, 1974

[54] AUTOMATIC WIPER AND LIGHT CONTROL

[76] Inventor: Thurman A. Glaze, 9704 Tokomah Trl., Tampa, Fla. 33617

[22] Filed: June 1, 1973

[21] Appl. No.: 365,858

[52] U.S. Cl................................ 307/10 LS, 315/82
[51] Int. Cl............................................... H02g 3/00
[58] Field of Search......... 307/10 LS, 10 R; 315/78, 315/79, 80, 81, 82; 318/445 WW

[56] References Cited
UNITED STATES PATENTS

| | | | |
|---|---|---|---|
| 3,500,119 | 3/1970 | Price | 307/10 LS |
| 3,500,120 | 3/1970 | Schultz | 307/10 LS |
| 3,519,837 | 7/1970 | Nolin et al. | 307/10 LS |

*Primary Examiner*—Herman J. Hohauser
*Attorney, Agent, or Firm*—Robert F. Ruemeli

[57] ABSTRACT

A system is provided for automatically turning on head and tail lights of a motor vehicle when the vehicle windshield wipers are turned on. However, when the ignition switch is in other than the normal "On" position, the windshield wipers may be operated without the lights on, as when watching a drive-in movie in the rain.

3 Claims, 4 Drawing Figures

PATENTED JUL 16 1974  3,824,405

AUTOMATIC WIPER AND LIGHT CONTROL

This invention relates to a light control system for vehicles and, more particularly, to such a system for automatically turning on the vehicle road lights when its windshield wiper is turned on.

BACKGROUND OF THE INVENTION

It is common practice with many drivers to turn on their head lights and tail lights when driving in a rain. In some states, such as Florida, the traffic laws require that the head lights and tail lights to be on whenever driving in the rain. On many occasions a driver will, through necessity, turn on his windshield wiper to provide better vision, but will overlook turning on his head and tail lights. To overcome such an oversight, the present invention provides a control system for automatically turning on suitable vehicle road lights whenever the windshield wiper is turned on.

However, when the vehicle is parked, as when watching a drive-in movie in the rain for example, it may be desirable to turn on the windshield wipers without turning on the vehicle lights. The control system therefore provides for operating the lights responsive to operation of the windshield wiper control only when the vehicle ignition switch is in its normal on position.

A difficulty which may be encountered in a control system of this type is feedback of reverse flow of current through the system under certain conditions. In order to prevent such difficulty, as when the typical light switch of the vehicle and the windshield wiper control are on at the same time, a diode is provided in the circuit between the windshield wiper control switch and the light switch connectors to the tail lights.

BRIEF DESCRIPTION OF THE INVENTION

The invention, in brief, is directed to turning on road lights of a motor vehicle whenever the windshield wipers are turned on during normal operation of the vehicle. A light control switch connected in circuit with the lights is operated responsive to operation of the windshield wiper control to turn on the lights whenever the windshield wiper control is turned on. However, in the event that the vehicle ignition switch is in other than its normal "On" position, the light control switch is taken out of circuit, so that the windshield wiper may be operated without turning on the vehicle lights. Additionally, provision is made for preventing reverse flow of current from the vehicle lights to the windshield control switch when both the control switch and the typical light switch of the vehicle are on at the same time.

It is a primary object of this invention to provide a new and useful system for turning on vehicle lights whenever the vehicle windshield wiper is turned on during normal operation of the vehicle. A related object is provision for effectively preventing reverse flow of current from the typical lights and the windshield wiper controls when both are in their "On" positions.

A more specific object is provision of a new and useful system for use in a vehicle having road lights and a windshield wiper, the system including a wiper control for turning the wiper on and off, and responsive thereto for turning the lights of the vehicle on and off, respectively, when the lights have not otherwise been turned on. A related object is provision for effectively preventing reverse flow of power from the lights to the wiper control.

These and other objects and advantages of the invention will be apparent from the following description and the accompanying drawing.

DESCRIPTION OF THE ILLUSTRATED EMBODIMENT

Figure 1:
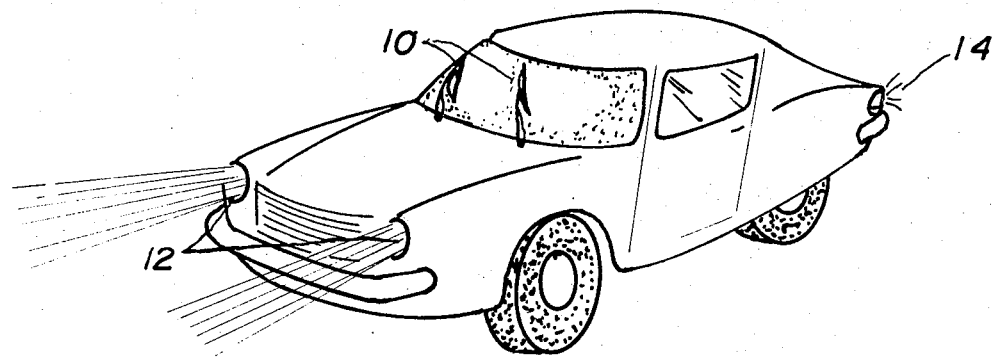
FIG. 1 is a schematic perspective view of an automobile including the subject system and showing its head and tail lights turned on and its windshield wiper in operation.

FIG. 1 shows a typical motor vehicle in the form of an automobile having its windshield wipers in operation and at the same time its road lights including head lights 12 and tail lights 14 on, in typical manner. However, the vehicle is equipped with a control system for automatically turning on the lights 12 and 14 whenever the windshield wipers are turned on during normal operation of the vehicle.

Figure 2:
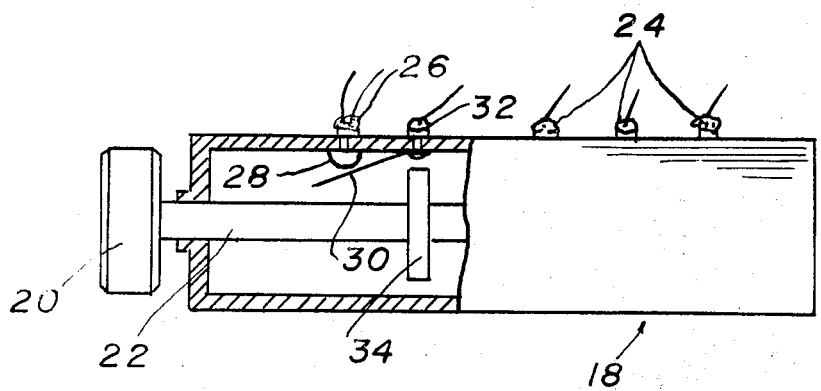
FIG. 2 is a schematic view of a windshield wiper control, with parts broken away and removed.

In order to provide automatic operation of the lights 12 and 14 responsive to operation of the windshield wipers 10, a modified windshield wiper control switch 16 is provided, as shown in FIG. 2. A pull-push type of switch 16 is shown in FIG. 2, and includes a suitable insulated casing 18 with suitable provision (not shown) for mounting the switch. A knob 20 is fixed to an outer end of a rod 22 slidably mounted in the casing 18. The inner end of the rod is suitably equipped (not shown) for regulating operation of the windshield wipers 10 by selectively connecting in circuit any one of three electrical connectors 24 which receive wires connected to a three-speed wiper motor (not shown). A light control connector 26 has a shank mounted in the insulated casing 18 and has a contact 28 on its inner end for engagement by a spring contact 30 suitably fixed to the casing 18 as by a rivet having a connector 32 at its outer end. A camming member 34 is fixed to the rod 22 for movement threwith and as the knob 20 is pulled outwardly to initiate operation of the windshield wiper 10, the camming member 34 cams the spring contact 30 into engagement with the contact 28 thus completing a circuit between the connectors 26 and 32 for turning on the lights 12 and 14, as will be fully described later.

Figure 3:
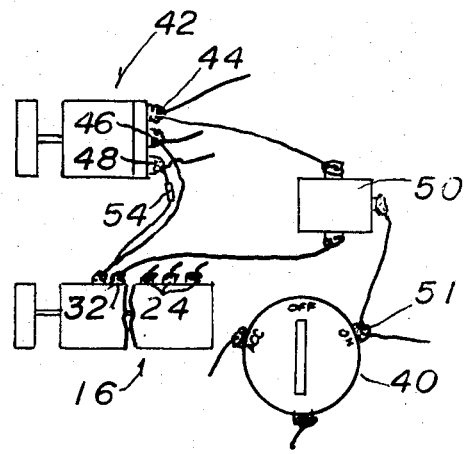
FIG. 3 is a schematic assembly of the control system.

As shown schematically in FIG. 3, a typical light control switch 42 has a power contact 44 for connection with the usual source of electrical power, and a pair of contacts 46 and 48 for connection with the head lights 12 and the tail lights 14, respectively, and with the light control connector 26 of the wiper switch 16. An ignition switch 40 has the typical "Off" position, "On" position and an "Accessory" position in typical fashion. A relay 50 is connected with an "On" connector 51 of the ignition switch 40, the power connector 44 of the light switch 42, and the connector 32 of the windshield wiper control switch 16 as will be more fully discussed with reference to FIG. 4.

Figure 4:
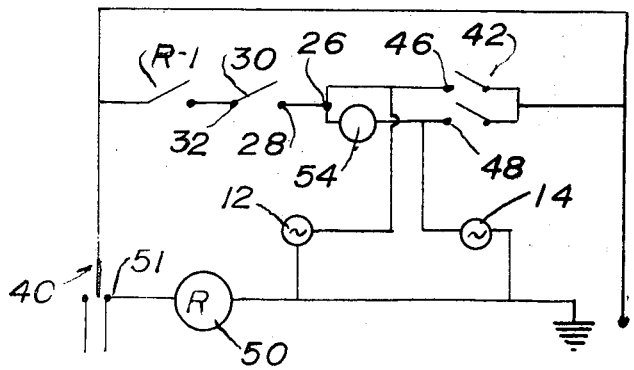
FIG. 4 is a diagram of a control circuit of the system.

FIG. 4 is a diagram of a preferred electrical circuit of the system. The usual source of power is connected with the ignition switch 40 for connection with either the accessory or the on circuit of the ignition switch.

When the ignition switch 40 in in the "On" position the relay 50 closes its normally open contact R-1 to complete a circuit from the power line through the windshield wiper light control connectors 26, 32, and contacts 28 and 30 (FIG. 2). The connector 26 is in circuit with the connectors 46 and 48 of the light switch 42 which is a typical type so that the tail lights may be energized separately through the connector 48, or the head lights 12 may be turned on through the connector 46 along with the tail lights 14.

A diode 54 is provided in the line between the connector 26 and the connector 48, thus preventing a reverse flow of current from the tail light connector 48 when the light control contacts 28–30 of the windshield wiper control 16 is closed and the relay contact R–1 is closed.

Thus, when the ignition switch 40 is in its "On" position and the windshield wiper switch 16 is turned on to operate the windshield wipers 10, the head lights 12 and the tail lights 14 are automatically turned on by the windshield wiper control 16. In the event that the ignition switch 40 is in the accessory position, the relay 50 is not energized so that its contact R-1 remains open, and the head and tail lights are not turned on even though the contacts 28 and 30 of the windshield wiper control 16 are closed.

While this invention has been described with reference to a particular embodiment in a particular environment, various changes may be apparent to one skilled in the art and the invention is therefore not to be limited to such embodiment or environment except as set forth in the appended claims.

What is claimed is:

1. A system for automatically turning on vehicle road lights responsive to operation of the vehicle windshield wiper, the system comprising a typical manually operated light switch for turning on the road lights, the light switch having terminal means connected in circuit for selectively operating the lights, a wiper switch for selectively operating the windshield wipers, and control means connected to said terminal means and responsive to said wiper switch turning the wiper on for providing power to said terminal means to turn the lights on.

2. A system as set forth in claim 1 in which the road lights include head and tail lights, and in which said terminal means includes a pair of terminals, one for providing power to the head lights and the other for providing power to the tail lights responsive to operation of the light switch, and said control means is connected to said terminals.

3. A system as set forth in claim 2 in which said control means includes a diode for preventing passage of power from a first of said terminals to a second of said terminals when said light switch has been operated to energize only the first terminal.

* * * * *